US009471837B2

(12) United States Patent
Anderson et al.

(10) Patent No.: US 9,471,837 B2
(45) Date of Patent: Oct. 18, 2016

(54) REAL-TIME ANALYTICS TO IDENTIFY VISUAL OBJECTS OF INTEREST (71) Applicant: INTERNATIONAL BUSINESS MACHINES CORPORATION, Armonk, NY (US)

(72) Inventors: Brian M. Anderson, Dunwoody, GA (US); Randy S. Johnson, O'Fallon, MO (US); Scott B. Katzman, Dallas, GA (US); John F. Kelley, Clarkesville, GA (US); Jacob C. Schneider, Lawrenceville, GA (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/515,125

(22) Filed: Oct. 15, 2014

(65) Prior Publication Data
US 2016/0055378 A1 Feb. 25, 2016

Related U.S. Application Data (63) Continuation-in-part of application No. 14/462,922, filed on Aug. 19, 2014.

(51) Int. Cl.
G06K 9/00 (2006.01)
G06F 3/01 (2006.01)
G06T 11/60 (2006.01)

(52) U.S. Cl.
CPC ........... *G06K 9/00671* (2013.01); *G06F 3/012* (2013.01); *G06F 3/017* (2013.01); *G06T 11/60* (2013.01); *G06F 2203/011* (2013.01)

(58) Field of Classification Search
CPC .. G06T 19/006; G02B 27/01; G02B 27/017; G02B 2027/0178; G06F 17/30
See application file for complete search history.

(56) References Cited

U.S. PATENT DOCUMENTS 6,964,023 B2 11/2005 Maes et al.
7,434,176 B1 10/2008 Froloff
(Continued)

FOREIGN PATENT DOCUMENTS

CN 102906623 A 1/2013
KR 20120035100 A 4/2012
(Continued)

OTHER PUBLICATIONS

"Smartglass"—Wikipedia, the free encyclopedia; Jun. 2014; http://en.wikipedia.org/wiki/Smartglasses.
(Continued)

*Primary Examiner* — Antonio A Caschera
(74) *Attorney, Agent, or Firm* — Brown & Michaels, PC; John R. Pivnichny (57) ABSTRACT A method of identifying and suggesting objects for a user within a user's field of vision of a personal imaging system. A user's field of vision within the system is monitored. The personal imaging system captures biometric data of the user regarding objects that are focused on within the user's field of vision. The biometric data and any identified emotions regarding the objects being focused on from the user is associated with the user's profile which includes at least demographics. A real-time correlation of the user's profile and demographics with other users is performed to provide a correlation interest score. The interest score may be used to recommend and direct the user's attention to other objects within the user's field of vision that the user may be interested in.

18 Claims, 7 Drawing Sheets

(56) References Cited

U.S. PATENT DOCUMENTS

| | | | |
|---|---|---|---|
| 7,547,279 | B2 | 6/2009 | Kim et al. |
| 7,729,914 | B2 | 6/2010 | Tato et al. |
| 8,209,182 | B2 | 6/2012 | Narayanan |
| 8,254,699 | B1 | 8/2012 | Zhao et al. |
| 8,407,055 | B2 | 3/2013 | Asano et al. |
| 8,462,996 | B2 | 6/2013 | Moon et al. |
| 8,482,859 | B2 | 7/2013 | Border et al. |
| 8,510,166 | B2 | 8/2013 | Neven |
| 8,832,124 | B2 * | 9/2014 | Partington ......... G06K 9/00973 382/115 |
| 2002/0044152 | A1 * | 4/2002 | Abbott, III ............. G06T 11/00 345/629 |
| 2004/0034652 | A1 | 2/2004 | Hofmann et al. |
| 2007/0106138 | A1 | 5/2007 | Beiski et al. |
| 2008/0052080 | A1 | 2/2008 | Narayanan |
| 2008/0096533 | A1 | 4/2008 | Manfredi et al. |
| 2008/0221401 | A1 | 9/2008 | Derchak et al. |
| 2009/0285456 | A1 | 11/2009 | Moon et al. |
| 2010/0036660 | A1 | 2/2010 | Bennett |
| 2011/0007142 | A1 | 1/2011 | Perez et al. |
| 2011/0040155 | A1 | 2/2011 | Guzak et al. |
| 2012/0116186 | A1 | 5/2012 | Shrivastav et al. |
| 2012/0194554 | A1 | 8/2012 | Kaino et al. |
| 2012/0212406 | A1 | 8/2012 | Osterhout et al. |
| 2012/0232968 | A1 | 9/2012 | Calman et al. |
| 2012/0323087 | A1 | 12/2012 | Leon Villeda et al. |
| 2013/0018837 | A1 | 1/2013 | Lee |
| 2013/0050260 | A1 | 2/2013 | Reitan |
| 2013/0179303 | A1 | 7/2013 | Petrou et al. |
| 2013/0183646 | A1 | 7/2013 | Lusted et al. |
| 2013/0187929 | A1 | 7/2013 | Perez et al. |
| 2013/0222371 | A1 | 8/2013 | Reitan |
| 2013/0229433 | A1 | 9/2013 | Reitan |
| 2013/0235034 | A1 | 9/2013 | Reitan |
| 2013/0235079 | A1 | 9/2013 | Reitan |
| 2013/0249947 | A1 | 9/2013 | Reitan |
| 2013/0307842 | A1 | 11/2013 | Grinberg et al. |
| 2014/0019867 | A1 | 1/2014 | Lehtiniemi et al. |
| 2014/0022370 | A1 | 1/2014 | Sohn et al. |
| 2014/0063061 | A1 | 3/2014 | Reitan |
| 2014/0068472 | A1 | 3/2014 | Guzak et al. |
| 2014/0089399 | A1 | 3/2014 | Chun et al. |
| 2014/0091897 | A1 | 4/2014 | Lemmey et al. |
| 2014/0112556 | A1 | 4/2014 | Kalinli-Akbacak |
| 2014/0136450 | A1 | 5/2014 | Lee |
| 2014/0184550 | A1 | 7/2014 | Hennessey et al. |

FOREIGN PATENT DOCUMENTS

| | | |
|---|---|---|
| WO | 2012139271 A1 | 10/2012 |
| WO | 2013024470 A1 | 2/2013 |
| WO | 2013032955 A1 | 3/2013 |
| WO | 2013171731 A1 | 11/2013 |

OTHER PUBLICATIONS

Hajimirza, S et al. "Reading Users' Minds From Their Eyes: A Method for Implicit Image Annotation." IEEE Transactions on Multimedia, vol. 14, No. 3, pp. 805-815, Jun. 2012.

"Cars could soon monitor our Emotions: Device reads facial expression to prevent road rage." http://www.dailymail.co.uk/sciencetech/article-2580969/Cars-soon-monitor-EMOTIONS-Device-reads-facial-expressions-identify-anger-prevent-road-rage.html; Mar. 2014.

"Emotion-Recognizing Smart Glasses." http://www.trendhunter.com/trends/emotient-app; Mar. 2014.

Bednarik, R et al. "What do you want to do next: A novel approach for intent prediction in gaze-based interaction." Association for Computing Machinery, Inc; ACM 978-1-4503-1225-7/12/0003; pp. 83-90, Mar. 2012.

Yu, Y et al. "An Automatic Method for Detecting Objects of Interest in Videos Using Surprise Theory." Proceeding of the IEEE International Conference on Information and Automation, Shenyang, China, pp. 620-625, Jun. 2012.

"Spit-Powered Fuel Cells Could Power Your Implanted Chip." http://animalnewyork.com/2014/spit-powered-fuel-cells-power-implanted-chip/; Apr. 2014.

Huang, J et al. "Automatic Detection of Object of Interest and Tracking in Active Video." Advances in Multimedia Information Processing—PCM 2009, Lecture Notes in Computer Science(LNCS) 5879, pp. 368-380, 2009.

Scharr, J. "Facial-Recognition Tech Can Read Your Emotions", http://www.livescience.com/42975-facial-recognition-tech-reads-emotions.html; Jan. 2014.

Schut, M. et al. "Biometrics for Emotion Detection (BED): Exploring the combination of Speech and ECG", Proceedings of the 1st International Workshop on Bio-inspired Human-Machine Interfaces and Healthcare Applications, in conjunction with BIOSTEC 2010, Valencia, Spain, Jan. 2010.

Conati, C et al. "A Study on Using Biometric Sensors for Monitoring User Emotions in Educational Games", Department of Computer Science, University of British Columbia; 2003.

List of related applications. Oct. 14, 2014.

* cited by examiner

REAL-TIME ANALYTICS TO IDENTIFY VISUAL OBJECTS OF INTEREST

CROSS-REFERENCE TO RELATED APPLICATIONS

This application is a continuation-in-part of parent patent application Ser. No. 14/462,922, filed Aug. 19, 2014, entitled, "REAL-TIME ANALYTICS TO IDENTIFY VISUAL OBJECTS OF INTEREST". The aforementioned application is hereby incorporated herein by reference.

BACKGROUND

The present invention relates to identification of visual objects within a field of vision, and more specifically to providing a suggestion regarding a focus field of vision seen through a personal imaging system based on passive interest input and real-time analytics.

Personal imaging systems are wearable computers which add information onto a reality or actually help people see better. Personal imaging systems may use an optical head-mounted display (OHMD) or computerized internet-connected glasses with transparent heads-up display (HUD) or augmented reality (AR) overlay that has the capability of reflecting projected digital images, which can be seen through by the user.

The personal imaging systems may collect information from internal or external sensors. Some of the sensors may track acceleration, temperature, altitude, barometric pressure, direction in a frame of reference that is stationary relative to the surface of the Earth, and other conditions.

Additionally, the personal imaging system may control, or retrieve data from, other instruments or computers, for example through wireless technologies. The personal imaging system may also contain a storage device.

Since the personal imaging system is worn, input to the personal imaging system may be accomplished through buttons, touchpad, compatible devices for remote control, speech recognition of commands issued by the user, gesture recognition, eye tracking and a brain-computer interface.

SUMMARY

According to one embodiment of the present invention, a method of identifying and suggesting objects for a user within a user's field of vision of a personal imaging system comprising a computer coupled to a plurality of sensors. The method comprising the steps of: the computer monitoring the user's field of vision of the personal imaging system through the plurality of sensors; the computer identifies at least one object within the user's field of vision of the personal imaging system, the computer: determining that the user is focusing on an object; capturing biometric levels of the user regarding at least one identified object in the user's field of vision through the personal imaging system; and associating at least the received biometric levels from the user with the user's profile comprising demographics and storing the feedback in a repository.

According to another embodiment of the present invention, a method of identifying and suggesting objects for a user within a user's field of vision of a personal imaging system comprising a computer coupled to a plurality of sensors. The method comprising the steps of: a computer monitoring the user's field of vision of the personal imaging system through the plurality of sensors; the computer identifies at least one object within the user's field of vision of the personal imaging system, the computer: capturing biometric levels of the user regarding at least one identified object in the user's field of vision through the personal imaging system; if the biometric levels of the user exceed threshold levels of biometrics of the user, the capturing facial expressions of the user regarding the at least one identified object in the user's field of vision through the personal imaging system; identifying emotions of the user based on the biometric levels and facial expressions captured regarding the at least one identified object in the user's field of vision through the personal imaging system; and associating at least the received identified emotions and biometric levels from the user with the user's profile comprising demographics and storing the feedback in a repository. The method also comprising the steps of if the computer determines that information regarding the object is present in the repository, the computer performing a real-time correlation of the user's profile, associated emotions from the biometric levels, and associated demographics with other user's demographics to provide a correlation interest score; and if the correlation interest score exceeds a pre-defined threshold, the computer highlighting the object in the user's field of vision through the personal imaging system.

According to another embodiment of the present invention, a method of identifying and suggesting objects for a user within a user's field of vision of a personal imaging system comprising a computer coupled to a plurality of sensors. The method comprising the steps of: a computer monitoring the user's field of vision of the personal imaging system through the plurality of sensors; the computer identifies at least one object within the user's field of vision of the personal imaging system, the computer: determining that the user is focusing on an object; requesting feedback from a user regarding at least one object identified in the user's field of vision through the personal imaging system, and associating received feedback from the user with the user's profile and associated demographics and storing the feedback in a repository. The step of requesting feedback from a user regarding at least one object identified in the user's field of vision through the personal imaging system comprising the steps of: capturing a user gesture in regards to the at least one object identified in the user's field of vision; capturing biometric levels of the user regarding the at least one identified object in the user's field of vision through the personal imaging system; if the biometric levels of the user exceed threshold levels of biometrics of the user, capturing facial expressions of the user regarding the at least one identified object in the user's field of vision through the personal imaging system; identifying emotions of the user based on the biometric levels and facial expressions captured regarding the at least one identified object in the user's field of vision through the personal imaging system; and associating at least the received identified emotions and biometric levels from the user with the user's profile comprising demographics and storing the feedback in a repository.

DETAILED DESCRIPTION

In an illustrative embodiment, it is recognized that the methods, computer program product and computer system may be implemented through a personal imaging system of a user which collects information from internal or external sensors. The personal imaging system may control, or retrieve data from, other instruments or computers, for example through wireless technologies and may contain a storage device. Input to the personal imaging system may be accomplished through buttons, touchpad, compatible devices for remote control, speech recognition of commands issued by the user, gesture recognition, eye tracking, microfacial expression recognition, breathing rate, and a brain-computer interface. Input to the personal imaging system may also include an armband, watch or other wearable device which receives biometric data of the user such as blood pressure, perspiration and galvanic skin conduction. Input to the personal imaging system may also include a dental implant which receives salivation level and chemical makeup of saliva of the user.

Figure 1:
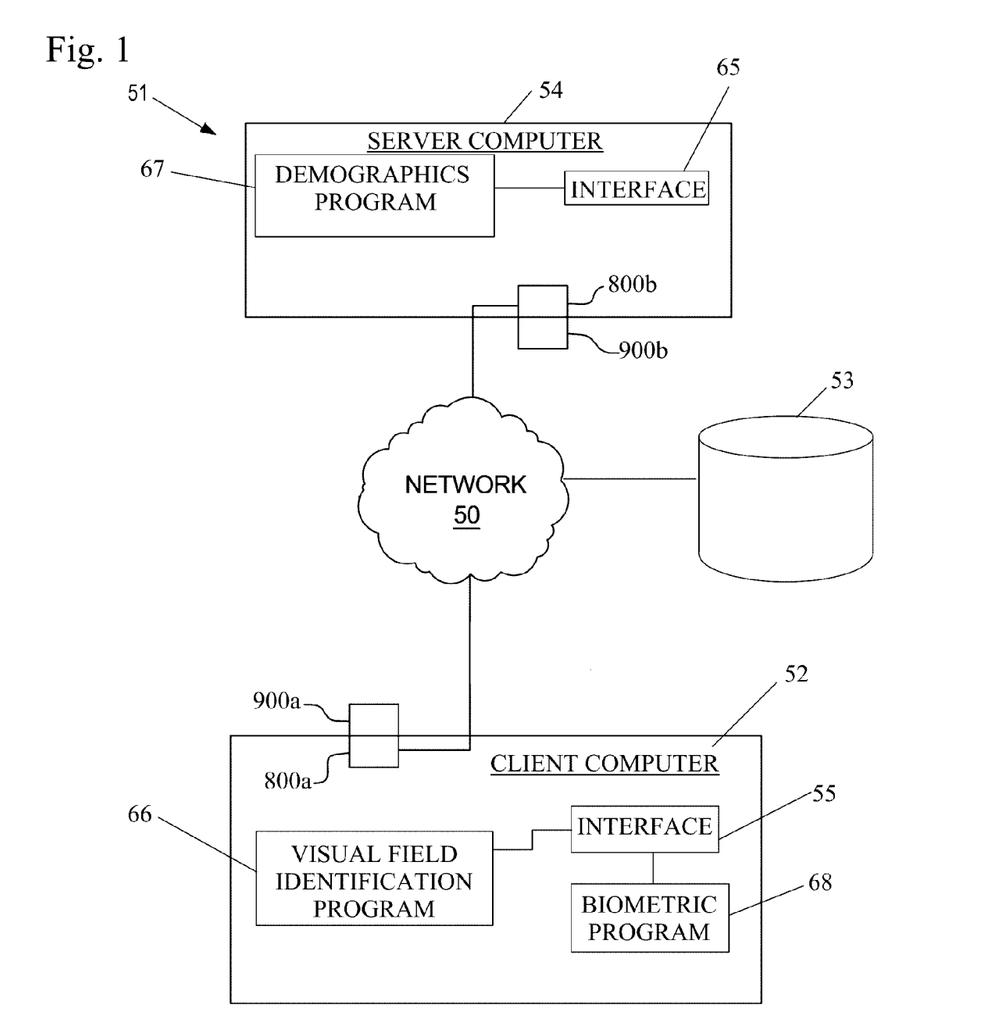
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Device computer 52 may be, for example, a mobile device, a cell phone, a personal digital assistant, a netbook, a laptop computer, a tablet computer, a desktop computer, personal imaging device, personal imaging device with an armband and/or dental implant.

Device computer 52 may contain an interface 55. The interface 55 may accept commands and data entry from a user. The interface 55 can be, for example, a command line interface, a graphical user interface (GUI), or a web user interface (WUI) or alternatively on server computer 54. The device computer 52 preferably includes a visual field identification program 66 and a biometric program 68. While not shown, it may be desirable to have the visual identification program 66 and the biometric program 68 be present on the server computer 54. Device computer 52 includes a set of internal components 800a and a set of external components 900a, further illustrated in FIG. 7.

Figure 7:
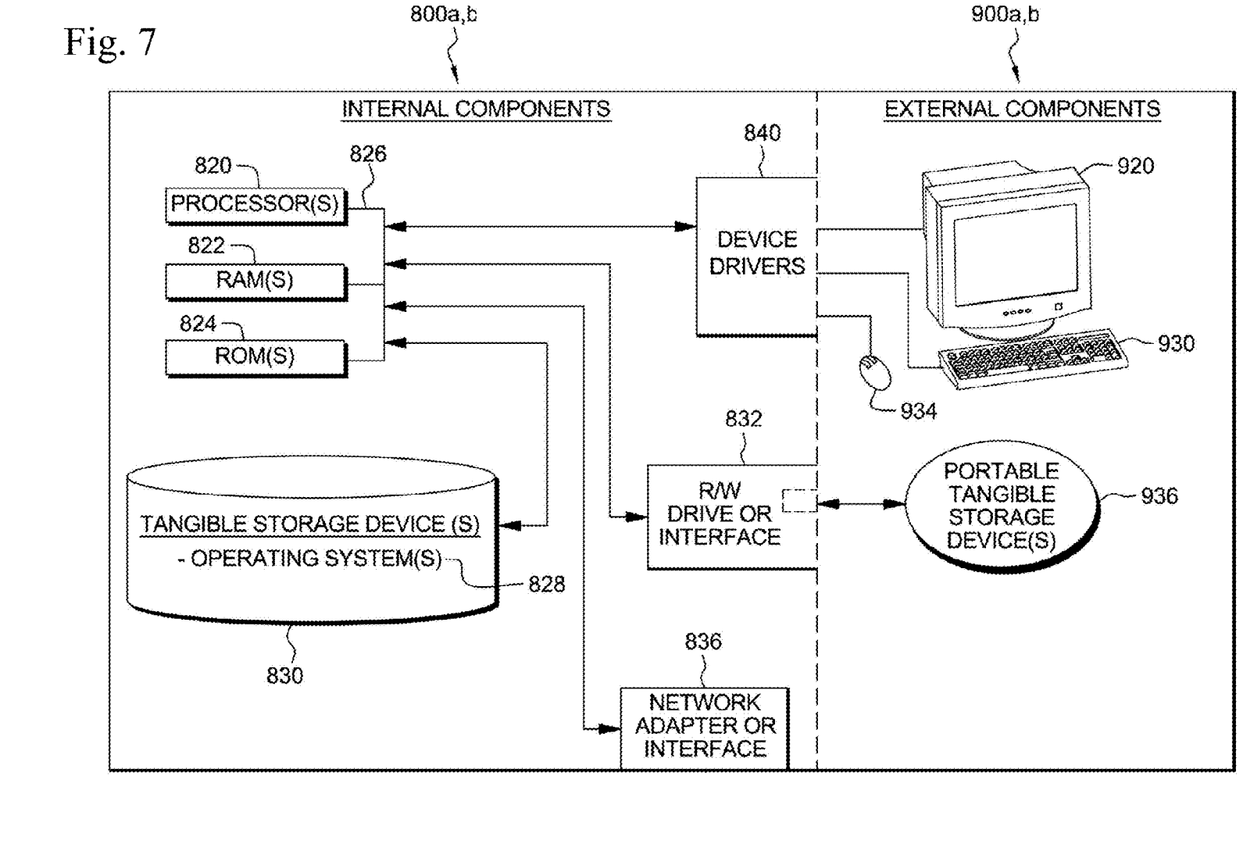
FIG. 7 illustrates internal and external components of a client or device computer and a server computer in which illustrative embodiments may be implemented.

Server computer 54 includes a set of internal components 800b and a set of external components 900b illustrated in FIG. 7. The server computer 54 may contain an interface 65. The interface 65 may accept commands, data entry, and a threshold score. The interface 65 can be, for example, a command line interface, a graphical user interface (GUI), or a web user interface (WUI). The server computer 54 also preferably includes a demographics program 67.

In the depicted example, server computer 54 provides information, such as boot files, operating system images, and applications to device computer 52. Server computer 54 can compute the information locally or extract the information from other computers on network 50.

Program code and programs such as a demographics program 67, a visual field identification program 66, and biometric program 68 may be stored on at least one of one or more computer-readable tangible storage devices 830 shown in FIG. 7, on at least one of one or more portable computer-readable tangible storage devices 936 as shown in FIG. 7, on repository 53 connected to network 50, or downloaded to a data processing system or other device for use. For example, program code and programs such as a demographics program 67, biometric program 68, and a visual field identification program 66 may be stored on at least one of one or more tangible storage devices 830 on server computer 54 and downloaded to the device computer 52. Alternatively, server computer 54 can be a web server, and the program code and programs such as a demographics program 67, a biometric program 68, and a visual field identification program 66 may be stored on at least one of the one or more tangible storage devices 830 on server computer 54 and accessed on the device computer 52. Demographics program 67, biometric program 68, and a visual field identification program 66 can be accessed on device computer 52 through interface 55. In other exemplary embodiments, the program code and programs such as a demographics program 67, biometric program 68, and a visual field identification program 66 may be stored on at least one of one or more computer-readable tangible storage devices 830 on server computer 54 or distributed between two or more servers.

Embodiments of the present invention are capable of being implemented in a cloud computing environment and in conjunction with any other type of computing environment now known or later developed.

The server computer 54 and repository 53 may be practiced in distributed cloud computing environments where tasks are performed by remote processing devices that are linked through a communications network. In a distributed cloud computing environment, program modules may be located in both local and remote computer system storage media including memory storage devices. A computer system/server computer may also communicate with one or more external devices, such as device computer 52. The computer system/server computer typically includes a variety of computer system readable media. Such media may be any available media that is accessible by computer system/ server computer, and it includes both volatile and non-volatile media, removable and non-removable media.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
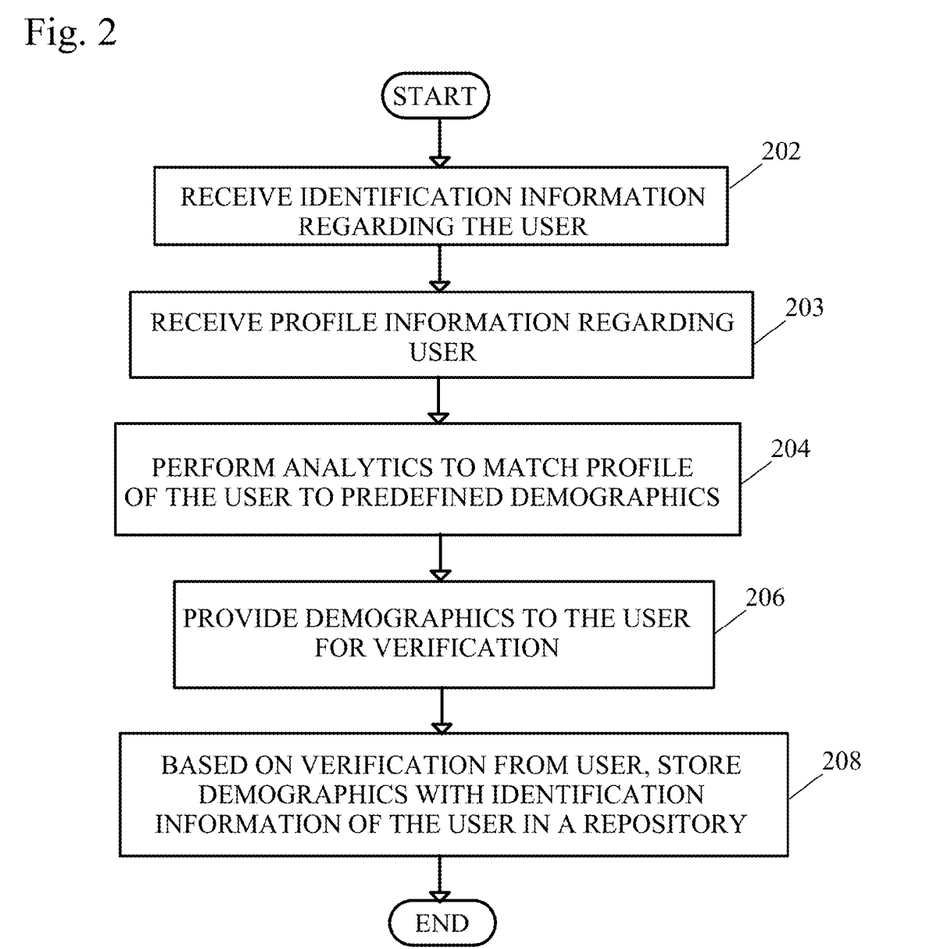
FIG. 2 shows a flow diagram of a method of registering a user within a demographic.

FIG. 2 shows a flow diagram of a method of registering a user within a demographic.

In a first step, identification information is received regarding a user that is to use a personal imaging system (step 202), for example by the demographics program 67. The user may enter the identification information through an interface of the personal imaging system itself, a web user interface (WUI) or alternatively on the server computer 54.

The identification information may include, but is not limited to, name, address, age, telephone number, e-mail address, and other similar information.

The system will also receive profile information from the user regarding the user's interests, preferences, likes or dislikes, or other information that can be used to find other users with similar tastes (step 203). This could be done by presenting the user with a questionnaire, a form asking for ranking of activities, or other methods.

Analytics are performed to match the profile information of the user to a database of predefined demographics (step 204), for example by the demographics program 67. The predefined demographics may include information on other users who might have similar tastes, potential objects or fields of interest, or other information.

The predefined demographics are provided to the user for verification (step 206). The user may be presented with potential matches of people, including some demographic information about them, or perhaps an indication of some information which may be used to suggest objects for him to look at. The user may then select which of the predefined demographics he believes best describes his preferences.

Once verification of at least one predefined demographic is received from the user, the verified demographics are stored with the identification of the user in a repository (step 208), for example repository 53, and the method ends.

Figure 3:
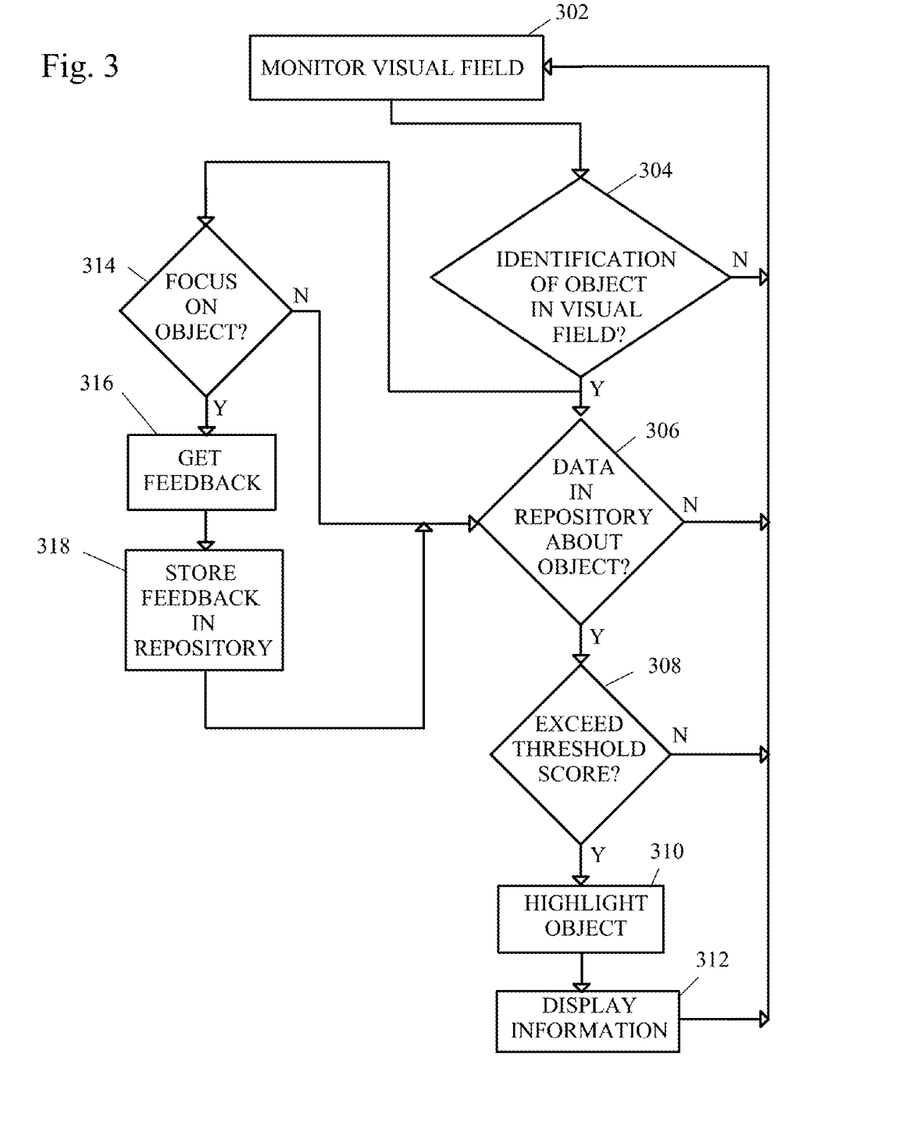
FIG. 3 shows a flow diagram of a method of identifying and suggesting objects for the user within the user's field of vision of a personal imaging system.

FIG. 3 shows a flow diagram of a method of identifying and suggesting objects for the user within the user's field of vision of a personal imaging system. It should be noted that the method of FIG. 3 preferably takes place after the method of FIG. 2.

In a first step, the visual field of the personal imaging system is monitored (step 302), for example by the visual field identification program 66.

If an object is identified in the visual field (step 304), and it is determined that the user of the personal imaging system is focusing on an object (step 314), the personal imaging system requests and obtains feedback regarding the object focused on by the user (step 316), for example through the visual field identification program 66. The feedback may be an indication of whether the user likes or dislikes the identified object, an indication of whether a user would wish to purchase the object or visit the place, if the user agrees with a price of the object, if the user "knows" the object, if the object can endanger or is dangerous to the user, if the object could be recommended to another person on social media, tagging/bookmarking the object for later consideration by the user or other feedback.

If it is determined that the user of the personal imaging system is not focusing on an object (step 314), the method continues to step 306 of determining whether information is present within the repository in the object.

Alternatively, if the user has disabled providing feedback or feedback is already present from the user regarding the object in the field, steps 314, 316 and 318 may be bypassed and the method proceeds to step 306.

The personal imaging system receives feedback from the user regarding the identified object, and stores the feedback in a repository (step 318). The stored feedback may be associated with the user's profile and demographics, for example through the demographics program 67. The feedback may be received from the user through buttons, touchpad, compatible devices for remote control, speech recognition of commands, gesture recognition, eye tracking, brain-computer interface and/or any other means. The repository may be repository 53 or another repository associated with the personal imaging system.

After the feedback is stored in the repository, the system determines whether data is present in the repository about the object (step 306), for example through the visual identification program 66. The data regarding the object may include, but is not limited to, characteristics of the object. Characteristics may include a correlation interest score, hours a particular place is open, a price for the object or fee for admission to the place, reviews by other users, and/or historical information. The correlation interest score is a score of the object in which a user profile and associated demographics are correlated with other users with similar demographics in real-time. The correlation interest score is calculated using correlation analysis, for example by the demographics program 67. The correlation score may be impacted by the feedback provided by the user. The correlation interest score may also include fuzzy correlation analysis which determines the strength of a linear relationship between fuzzy attributes and the direction of the relationship.

If the correlation interest score exceeds a threshold score (step 308), the object is identified within the visual field of the personal imaging system (step 310) to the user, for example through the visual field identification program 66. The identification could comprise highlighting the object. Some ways of highlighting the object include, but are not limited to, displaying an arrow pointing to the object, or putting a box, halo or other shape around the object, emphasizing the object with a color or any other way of identifying to the user that a particular object has been recognized and information about the object is available. The threshold score is preferably predefined.

Information regarding the object is then displayed on the visual field of the personal imaging system to the user (step 312), for example by the visual field identification program 66 and the method returns to step 302. The information may include, but is not limited to, characteristics of the at least one object. The information displayed or the identification of the object may distinguish whether the object being highlighted is a correlated interest based on demographics associated with the user's profile.

In another embodiment, the personal imaging system would not display the information to the user regarding the highlighted object, unless the user specifically requested the information regarding the highlighted object. The request may be received from the user through buttons, touchpad, compatible devices for remote control, speech recognition of commands, gesture recognition, eye tracking, a brain-computer interface and/or any other means.

If an object is not identified in the visual field (step 304), the method returns to step 302.

If data regarding the object in the visual field of the personal imaging system is not present in the repository (step 306), the method returns to step 302.

If the correlation interest score of the object does not exceed a threshold score (step 308), the method returns to step 302.

Figure 4:
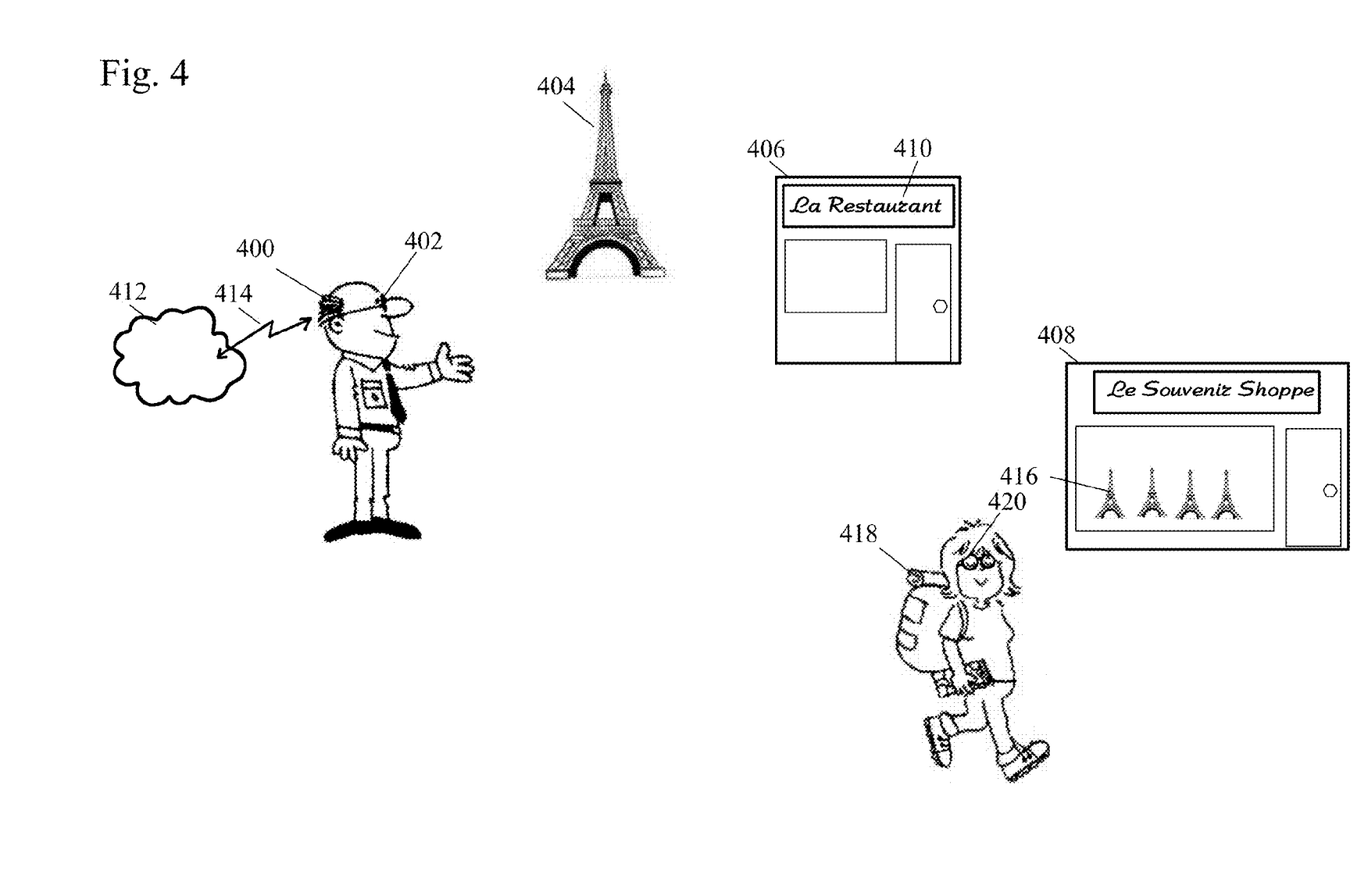
FIG. 4 shows a schematic of an example of the method of identifying and suggesting objects for the user within the user's field of vision of a personal imaging system based on feedback.

FIG. 4 shows a schematic of an example of the method of identifying and suggesting objects for the user within the user's field of vision of a personal imaging system.

Joe 400 purchases a personal imaging system 402 and sends his identification to the personal imaging system 402 or through a computer to the personal imaging system to establish a profile that includes Joe's basic information and his preferences. The personal imaging system 402 performs analytics to match at least some of Joe's information to at least one predefined demographic, for example art history buff and historian. The predefined demographic is provided to Joe for verification along with a list of objects that may be of interest to Joe, for example the Eiffel Tower and the Mona Lisa. Joe verifies that he is interested in the Eiffel Tower and is a historian.

Joe 400 is touring Paris and notices the Eiffel Tower 404. Joe 400 focuses on the Eiffel Tower 404 and a halo forms around it and flashes within the field of vision of the personal imaging system 402. Joe 400 submits his interest in the Eiffel Tower 404 through nodding his head. The personal imaging system 402 receives Joe's feedback regarding his interest in the Eiffel Tower 404 and the feedback is sent to a cloud service 412 through a connection 414. Due to Joe's interest and feedback, additional information regarding the Eiffel Tower 404 may be displayed to Joe through the personal imaging system.

Joe 400 notices signage 410 for a restaurant called "La Restaurant" 406 that Joe 400 has eaten at and did not like. He focuses on the signage 410 and when the halo forms around the signage 410, Joe 400 shakes his head to indicate that he does not like the restaurant 406. The personal imaging system 402 receives Joe's feedback regarding his disinterest in the restaurant 406 and the feedback is sent to a cloud service 412 through a connection 414.

Joe 400 continues to walk around Paris and heads into a store 408 and glances past an Eiffel Tower miniature 416, but does not notice it. The system recognizes the miniature Eiffel Tower as an object, and looks it up in the database. Since Joe has indicated that he is interested in the Eiffel Tower previously, the system assigns a high score to the Eiffel Tower miniature object. An indicator is displayed by the system to direct Joe's attention to the Eiffel Tower miniature 416 based on his interest in the real Eiffel Tower which he expressed earlier.

As Joe 400 continues to walk around Paris, another restaurant appears in the visual field. The personal imaging system looks up the restaurant in the database and finds some information on it which indicates that people having similar demographics to Joe's rated this new restaurant as being similar to "La Restaurant". Based on Joe's disinterest or dislike of "La Restaurant", the system assigns a low score to the new restaurant and does not point it out to Joe.

Sally 418 also travels to Paris as a tourist and has a personal imaging system 420. Sally is in the same age range as Joe and has verified an interest in some of the same objects as Joe. As she walks around Paris, an Eiffel Tower miniature 416 enters her field of vision. As with Joe, the system looks up the Eiffel Tower, discovers it in the database, and assigns a higher score to the Tower because others having similar demographics (i.e. Joe) were interested in it. The system puts an indicator within Sally's field of vision to direct her attention to the Eiffel Tower miniatures 416 in the "Le Souvenir Shoppe" 408. The indicator in her field of vision preferably indicates that this indication is based on correlated interest, not her specific interest in the object. She likes the Eiffel Tower and decides to purchase the Eiffel Tower miniature 416.

In another example, the personal imaging system may be used to train an individual for a new job based on demographics and feedback of objects associated with the demographic. In this example, the personal imaging system utilizes a demographic such as a corporate 'role' to determine suggestions for focusing on objects within the field of vision.

Within a company, safety inspectors may wear a personal imaging system while carrying out their jobs as safety inspectors. The safety inspectors when wearing the personal imaging system indicate that their demographic information is to be equivalent to a job role, for example safety inspector.

As the safety inspectors inspect various objects at plants within the company, for each object they focus on, the personal imaging system records any actions or feedback the safety inspector provides and the information is sent to a central server and stored.

When safety inspectors are newly hired by the company, the newly hired safety inspectors wear the personal imaging system and the personal imaging system draws their attention to most often focused on objects by other safety inspectors that work for the company based on the demographic.

This example could apply to quality control technicians or other jobs within a company.

In another example, the personal imaging system may be used to solve a problem that does not have explicit instructions, such as solving a printer jam. In order to solve the printer jam, the personal imaging system would utilize both the demographics and a record of an object focus sequence.

An object focus sequence includes the focusing on an object and storing of an object. Common focus sequences could be determined through a near real time or data mining algorithm looking for commonalities between object to object focus patterns by the user of the personal imaging system. The storing of the object focus sequence provides feedback for the user's profile. This sequence would take place continually when the user is wearing the personal imaging system. The object focus sequence may also be used to make recommendations of objects for the user to focus on through an algorithm and may alter a recommendation to a user to include a common object in a focus sequence instead another object to focus on.

A user receives a personal imaging system and provides user information and demographic information such as their job and skill set, which in this case is an accountant. The personal imaging system associates a specific skill set with a specific job, and therefore can provide assistance for certain tasks depending on the user's skill set.

For example, for the user who is an accountant fixing a printer jam, the personal imaging system identifies the printer and model number and the user focuses on the "jammed" error on the printer display. The personal imaging system considers the demographic and skill set associated with being an accountant and provides data for aiding the user in resolving the paper jam. The personal imaging system recognize the "jammed" error and as the user looks at the printer, the personal imaging system highlights different parts of the printer with varying levels of intensity based on the number of times the parts of the printer were focused on after the printer displayed a "jammed" state. For this example, the component of the printer that was most intensely highlighted was a lever that opens the access panel to the paper feeder.

It should be noted that if the user wearing the personal imaging system had the demographic or job role of "printer specialist", the personal imaging system may have instead highlighted an access port which is only accessible through specialized tools of a printer specialist.

The user uses the lever to release an access panel, opening the panel. The personal imaging system recognizes that the user is manipulating the lever based on the increased focusing on the lever. The personal imaging system highlights the lever necessary to pull out the toner tray, as this is the next object intensely highlighted and based on a sequence of the prior two objects observed (the "jammed" display state and the access panel lever).

The user manipulates the toner lever. The personal imaging system then highlights the gap the paper travels through as it is a prominent feature in the visual field, even though it is not an actual object itself. This gap is intensely highlighted and based on a sequence of the prior objects observed.

A jammed piece of paper is present in the gap and the user pulls out the paper. The personal imaging system highlights the levers necessary to lock the toner track pack in place and close the access panel through highlighting. The user then focuses on the printer display and determines that the error message has been cleared.

The personal imaging system can also be used by multiple experts in the same field to aid others in the same field who are not experts to locate problems and fix them. The above example could also apply to a user who is a printer specialist but not an expert.

Figure 5:
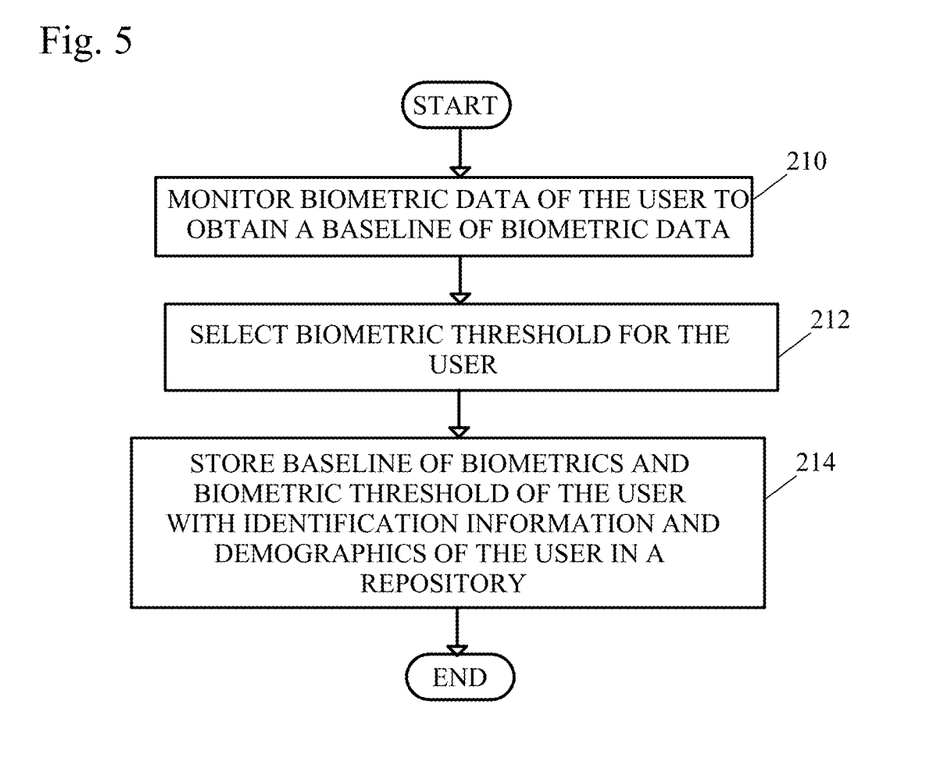
FIG. 5 shows a flow diagram of a method of obtaining a biometric baseline of a user.

FIG. 5 shows a flow diagram of a method of obtaining a biometric baseline of a user. Biometrics of the user are metrics related to human characteristics and traits and can include both behavioral and psychological characteristics. It should be noted that the method of FIG. 5 preferably takes place after the method of FIG. 2 of registering a user within a demographic. Therefore, the user's identification information and demographics are established prior to receiving demographics.

Prior to obtaining a biometric baseline, a user wears the personal imaging system and associated biometric sensors. The biometric sensors may be a dental implant that monitors salvation level and chemical makeup of a user's saliva. The biometric sensors may also be an armband that monitors heart rate, blood pressure, perspiration and galvanic skin conduction. The personal imaging system also monitors breathing rate, for example through a microphone. The personal imaging system additionally monitors eye dilation through a back facing camera.

In a first step, the personal imaging device monitors biometric data of the user to obtain a baseline of biometric data (step 210), for example through the sensors of the personal imaging device and the biometric program 68. The biometric data may include, but is not limited to salvation level, chemical makeup of the user's saliva, heart rate blood pressure, perspiration, galvanic skin conduction, breathing rate, eye dilation, micro-facial expressions and other body reactions.

A biometric threshold level is selected for a user based on the baseline of biometric data (step 212), for example by the biometric program 68.

The biometric baseline and threshold of the user is then stored with identification information and demographics of the user in a repository (step 214), for example by the biometric program.

Figure 6:
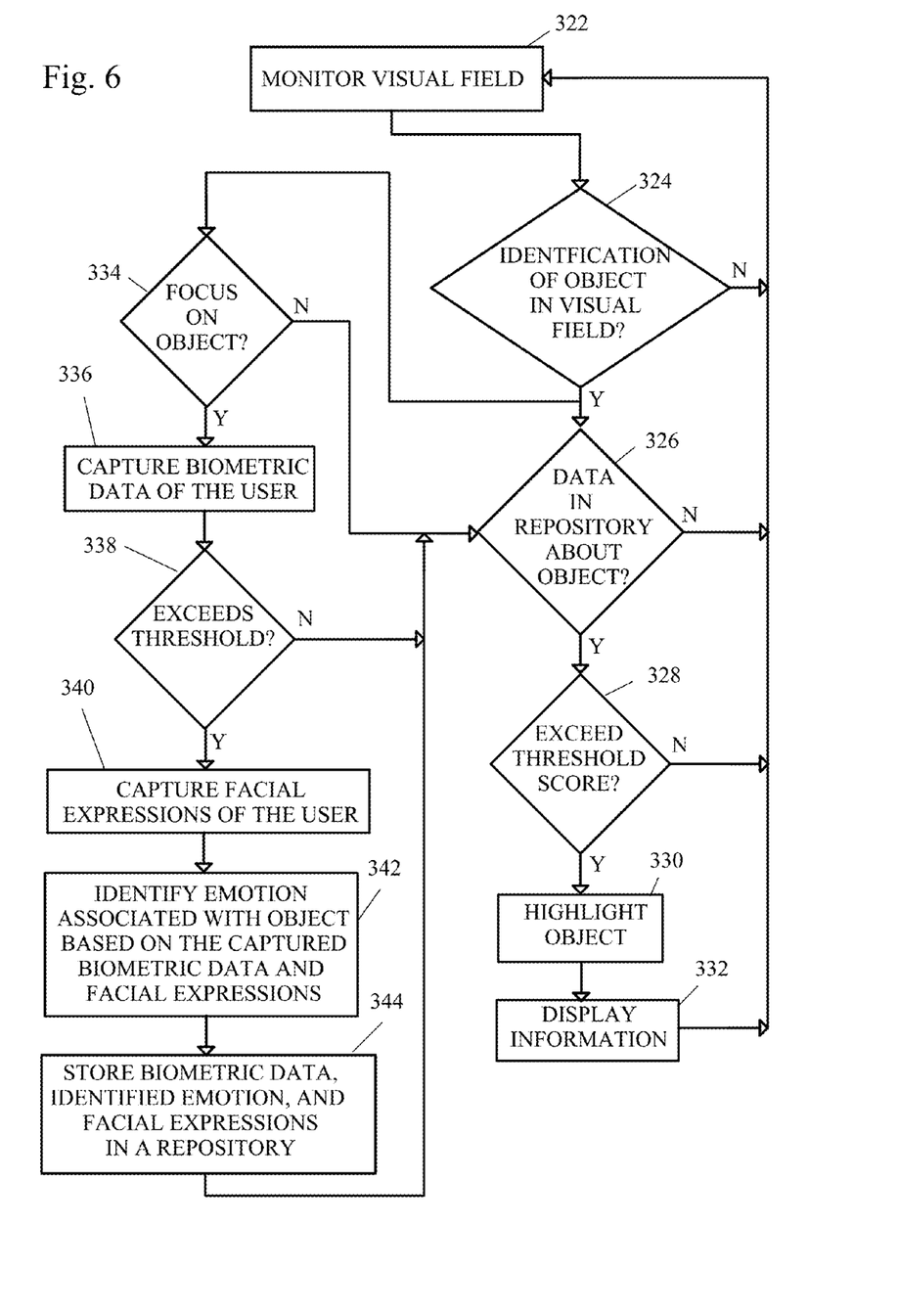
FIG. 6 shows a flow diagram of a method of identifying and suggesting objects for the user within the user's field of vision of a personal imaging system based on a user's biometrics.

FIG. 6 shows a flow diagram of a method of identifying and suggesting objects for the user within the user's field of vision of a personal imaging system based on a user's biometrics. It should be noted that the method of FIG. 6 preferably takes place after the method of FIG. 2 and FIG. 5.

In a first step, the visual field of the personal imaging system is monitored (step 322), for example by the visual field identification program 66.

If an object is identified in the visual field (step 324), and it is determined that the user of the personal imaging system is focusing on an object (step 334), the personal imaging system captures a user's current biometric data (step 336) through the personal imaging system, for example through the biometric program 68.

The user's current biometric is compared to the user's baseline biometric level and if the user's current biometrics exceeds the threshold level of biometrics for the user (step 338), the user's facial expressions are captured (step 340), for example through a camera of the personal imaging system through the biometric program 68. Emotions of the user associated with the object being focused on are identified from the user's current biometrics and the user's facial expressions (step 342). The identification of emotions takes into account physiological signals and their associations with emotions.

The user's current biometrics, the user's facial expressions and the identified emotion in relation to an object being focused on are stored as biometric feedback in a repository (step 344). The amount the user's biometrics exceed the threshold level may also be stored in the repository. Alternatively, just the amount the user's biometrics exceed the threshold level and the identified emotion may be stored in the repository. The method then continues to step 326.

The stored biometric feedback may be associated with the user's profile and demographics, for example through the demographics program 67. The repository may be repository 53 or another repository associated with the personal imaging system.

If it is determined that the user of the personal imaging system is not focusing on an object (step 334), the method continues to step 326 of determining whether information is present within the repository in the object.

Alternatively, if the user has disabled providing their biometrics or their biometrics and emotional feedback is already present from the user regarding the object in the field, steps 334, 336, 338, 340, 342, and 344 may be bypassed and the method proceeds to step 326.

After the biometric feedback is stored in the repository, the system determines whether data is present in the repository about the object (step 326), for example through the visual identification program 66. The data regarding the object may include, but is not limited to, characteristics of the object. Characteristics may include a correlation interest score, biometrics of a user in response to the object, emotions of a user towards an object, hours a particular place is open, a price for the object or fee for admission to the place, reviews by other users, and/or historical information. The correlation interest score is a score of the object in which a user profile and associated demographics are correlated with other users with similar demographics in real-time. The correlation interest score is calculated using correlation analysis, for example by the demographics program 67. The correlation score may be impacted by the biometric feedback provided by the user. The correlation interest score may also include fuzzy correlation analysis which determines the strength of a linear relationship between fuzzy attributes and the direction of the relationship.

If the correlation interest score exceeds a threshold score (step 328), the object is identified within the visual field of the personal imaging system (step 330) to the user, for example through the visual field identification program 66. The identification could comprise highlighting the object. Some ways of highlighting the object include, but are not limited to, displaying an arrow pointing to the object, or putting a box, halo or other shape around the object, emphasizing the object with a color or any other way of identifying to the user that a particular object has been recognized and information about the object is available. The threshold score is preferably predefined.

Information regarding the object is then displayed on the visual field of the personal imaging system to the user (step 332), for example by the visual field identification program 66 and the method returns to step 302. The information may include, but is not limited to, characteristics of the at least one object. The information displayed or the identification of the object may distinguish whether the object being highlighted is a correlated interest based on demographics associated with the user's profile.

In another embodiment, the personal imaging system would not display the information to the user regarding the highlighted object, unless the user specifically requested the information regarding the highlighted object. The request may be received from the user through buttons, touchpad, compatible devices for remote control, speech recognition of commands, gesture recognition, eye tracking, a brain-computer interface and/or any other means.

If an object is not identified in the visual field (step 324), the method returns to step 322.

If data regarding the object in the visual field of the personal imaging system is not present in the repository (step 326), the method returns to step 322.

If the correlation interest score of the object does not exceed a threshold score (step 328), the method returns to step 322.

In another embodiment, step 316 of FIG. 3 of obtaining feedback from a user may include the steps 336, 338, 340, 342 and 344 from FIG. 6 to capture biometric data and facial expression to identify an emotion in response the object being focused on. Therefore, in addition to obtaining feedback from the user, including an indication of whether the user likes or dislikes the identified object, an indication of whether a user would wish to purchase the object or visit the place, if the user agrees with a price of the object, if the user "knows" the object, if the object can endanger or is dangerous to the user, if the object could be recommended to another person on social media, tagging/bookmarking the object for later consideration by the user, the user's biometrics and facial expression may also be used to identify emotions the user has associated with the object being focused on.

In an example, a user wearing a personal imaging system is walking down the street and focuses on an infant being carried by their mother. The infant is smiling and giggling. The user of the personal imaging system smiles in response to the infant. Biometric data is captured while the user is focusing on the infant. The biometric data captured is compared to a threshold level of biometrics of the user and exceeds a positive emotion threshold level of the user. The biometric feedback is stored with the user's profile and associated demographics. The infant is highlighted within the field of vision of the personal imaging system for the user. Based on the user's biometric reaction, and their profile with their associated demographics, other smiling infants may be highlighted or suggested to the user for focusing on by the personal imaging system.

In another example, a user wearing a personal imaging system is walking down the street and focuses on a cigarette butt in the gutter. The user of the personal imaging system frowns in dislike in response to the discarded cigarette. Biometric data is captured while the user is focusing on the discarded cigarette. The biometric data captured is compared to a threshold level of biometrics of the user and exceeds a negative emotion threshold level of the user. The biometric feedback is stored with the user's profile and associated demographics.

In yet another example, a user wears the personal imaging system and associated sensors. The associated sensors include an armband to monitor the user's heart rate, blood pressure, perspiration and galvanic skin conduction (through electrodes of the arm band); and a dental implant for monitoring salivation level and chemical makeup of the user's saliva. The personal imaging system additionally uses the microphone to monitor the user's breathing rate and a back facing camera to monitor the user's eye dilation. The personal imaging system and the associated sensors capture biometric data to create a biometric baseline in which other captured biometric data can be compared to signify interest by the user. The baseline is stored with the user's profile and associated demographics.

After the user has established a baseline, the user focuses on signage for a restaurant that the user very much likes. The personal imaging system identifies the signage as a contiguous object, for example using object recognition algorithms. The personal imaging system captures the user's current biometric data. In this case, the salivation of the user was increased, as sensed by the dental implant, and the user's eyes dilated, as detected by the back facing camera of the personal imaging system. The current biometric data is compared to the user's biometric baseline to determine if the current biometric data exceeds a threshold for interest by the user. With the eye dilation and increased salivation, the current biometric data exceeds the biometric baseline or a threshold. The back facing camera of the personal imaging system then captures current facial expressions. Based on the facial expressions and other biometrics, any of the user's emotions towards the signage are identified. The like or dislike of the signage is correlated to the identified emotion and stored in a repository associated with the signage as well as the user's profile and associated demographics.

The user continues walking and comes to a wall with posting of various events in the area. The user quickly glances at the wall of postings and begins to walk away. The personal imaging system displays an indicator within the user's field of vision directing the user to look at the bottom corner of the wall. The user complies and the logo for the restaurant the user likes is highlighted. The posting includes special pricing for dishes the user enjoys at the restaurant.

FIG. 7 illustrates internal and external components of device computer 52 and server computer 54 in which illustrative embodiments may be implemented. In FIG. 7, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, demographics program 67, biometric program 68, and visual field identification program 66 are stored on one or more of the computer-readable tangible storage devices 830 for execution by one or more of the processors 820 via one or more of the RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Demographics program 67, biometric program 68, and visual field identification program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Demographics program 67, biometric program 68, and visual field identification program 66 can be downloaded to the device computer 52 and server computer 54 from an external computer via a network (for example, the Internet, a local area network or other, wide area network) and network adapter or interface 836. From the network adapter or interface 836, demographics program 67 and visual field identification program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Demographics program 67, biometric program 68, and visual field identification program 66 can be written in various programming languages including low-level, high-level, object-oriented or non object-oriented languages. Alternatively, the functions of a demographics program 67, biometric program 68, and a visual field identification program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of identifying and suggesting objects for a user within a user's field of vision of a personal imaging system comprising a computer coupled to a plurality of sensors, comprising the steps of:
    the computer monitoring the user's field of vision of the personal imaging system through the plurality of sensors;
    the computer identifies at least one object within the user's field of vision of the personal imaging system, the computer:
        determining that the user is focusing on an object;
        capturing biometric levels of the user regarding at least one identified object in the user's field of vision through the personal imaging system;
        if the biometric levels of the user exceed threshold levels of biometrics of the user, capturing facial expressions of the user regarding the at least one identified object in the user's field of vision through the personal imaging system; and
        associating at least the biometric levels from the user with the user's profile comprising demographics and storing the feedback in a repository.

2. The method of claim 1, further comprising the steps of:
    identifying emotions of the user based on the biometric levels and facial expressions captured regarding the at least one identified object in the user's field of vision through the personal imaging system; and
    associating at least the received identified emotions and biometric levels from the user with the user's profile comprising demographics and storing the feedback in a repository.

3. The method of claim 2, further comprising the steps of:
    if the computer determines that information regarding the object is present in the repository, the computer performing a real-time correlation of the user's profile, associated emotions from the biometric levels, and associated demographics with other user's demographics to provide a correlation interest score; and
    if the correlation interest score exceeds a predefined threshold, the computer highlighting the object in the user's field of vision through the personal imaging system.

4. The method of claim 3, further comprising the step of displaying characteristics of the identified object to the user in the user's field of vision.

5. The method of claim 3, wherein the highlighting of the object in the user's field of vision through the personal imaging system indicates whether the object is recommended based on demographics of the user, biometric levels, associated emotions, and correlation interest score of the object.

6. The method of claim 1, prior to the step of the computer monitoring the user's field of vision, the method further comprising the steps of:
    the computer receiving identification information regarding the user of the personal imaging system;
    the computer receiving profile information from the user regarding the user's interests;
    the computer performing analytics to match the profile information of the user to predefined demographics;
    the computer providing demographics to the user for verification;
    based on the verification received from the user, storing demographics with the profile and identification of the user in the repository;
    the computer obtaining a baseline of biometric data of the user through the personal imaging system;
    the computer selecting a biometric threshold level for the user based on the baseline of biometric data received; and
    the computer storing the baseline of the biometric data of the user and the selected biometric threshold level for the user with identification of the user and demographics of the user.

7. The method of claim 1, wherein the biometric levels of the user are captured through sensors in communication with the personal imaging system monitoring physiological characteristics of the user.

8. A method of identifying and suggesting objects for a user within a user's field of vision of a personal imaging system comprising a computer coupled to a plurality of sensors, comprising the steps of:
    the computer monitoring the user's field of vision of the personal imaging system through the plurality of sensors;
    the computer identifies at least one object within the user's field of vision of the personal imaging system, the computer:
        capturing biometric levels of the user regarding at least one identified object in the user's field of vision through the personal imaging system;
        if the biometric levels of the user exceed threshold levels of biometrics of the user, capturing facial expressions of the user regarding the at least one identified object in the user's field of vision through the personal imaging system;
        identifying emotions of the user based on the biometric levels and facial expressions captured regarding the at least one identified object in the user's field of vision through the personal imaging system; and
        associating at least the received identified emotions and biometric levels from the user with the user's profile comprising demographics and storing the feedback in a repository;
    if the computer determines that information regarding the object is present in the repository, the computer performing a real-time correlation of the user's profile, associated emotions from the biometric levels, and associated demographics with other user's demographics to provide a correlation interest score; and
    if the correlation interest score exceeds a predefined threshold, the computer highlighting the object in the user's field of vision through the personal imaging system.

9. The method of claim 8, prior to the step of the computer monitoring the user's field of vision, the method further comprising the steps of:
    the computer receiving identification information regarding the user of the personal imaging system;
    the computer receiving profile information from the user regarding the user's interests;
    the computer performing analytics to match the profile information of the user to predefined demographics;
    the computer providing demographics to the user for verification;
    based on the verification received from the user, storing demographics with the profile and identification of the user in the repository;

the computer obtaining a baseline of biometric data of the user through the personal imaging system;

the computer selecting a biometric threshold level for the user based on the baseline of biometric data received; and the computer storing the baseline of the biometric data of the user and the selected biometric threshold level for the user with identification of the user and demographics of the user.

10. The method of claim 8, wherein the highlighting of the object in the user's field of vision through the personal imaging system indicates whether the object is recommended based on demographics of the user, biometric levels, associated emotions, and correlation interest score of the object.

11. The method of claim 8, further comprising the step of displaying characteristics of the object identified to the user in the user's field of vision.

12. The method of claim 8, wherein the biometric levels of the user are captured through sensors in communication with the personal imaging system monitoring physiological characteristics of the user.

13. A method of identifying and suggesting objects for a user within a user's field of vision of a personal imaging system comprising a computer coupled to a plurality of sensors, comprising the steps of:

the computer monitoring the user's field of vision of the personal imaging system through the plurality of sensors;

the computer identifies at least one object within the user's field of vision of the personal imaging system, the computer:

determining that the user is focusing on an object;

requesting feedback from a user regarding at least one object identified in the user's field of vision through the personal imaging system, comprising the steps of:

capturing a user gesture in regards to the at least one object identified in the user's field of vision;

capturing biometric levels of the user regarding the at least one identified object in the user's field of vision through the personal imaging system;

if the biometric levels of the user exceed threshold levels of biometrics of the user, capturing facial expressions of the user regarding the at least one identified object in the user's field of vision through the personal imaging system;

identifying emotions of the user based on the biometric levels and facial expressions captured regarding the at least one identified object in the user's field of vision through the personal imaging system; and associating at least the received identified emotions and biometric levels from the user with the user's profile comprising demographics and storing the feedback in a repository; and associating received feedback from the user with the user's profile and associated demographics and storing the feedback in a repository.

14. The method of claim 13, further comprising the steps of:

if the computer determines that information regarding the object is present in the repository, the computer performing a real-time correlation of the user's profile, associated emotions from the biometric levels, and associated demographics with other user's demographics to provide a correlation interest score; and if the correlation interest score exceeds a predefined threshold, the computer highlighting the object in the user's field of vision through the personal imaging system.

15. The method of claim 14, further comprising the step of displaying characteristics of the identified object to the user in the user's field of vision.

16. The method of claim 14, wherein the highlighting of the object in the user's field of vision through the personal imaging system indicates whether the object is recommended based on demographics of the user, biometric levels, associated emotions, and correlation interest score of the object.

17. The method of claim 13, prior to the step of the computer monitoring the user's field of vision, the method further comprising the steps of:

the computer receiving identification information regarding the user of the personal imaging system;

the computer receiving profile information from the user regarding the user's interests;

the computer performing analytics to match the profile information of the user to predefined demographics;

the computer providing demographics to the user for verification;

based on the verification received from the user, storing demographics with the profile and identification of the user in the repository;

the computer obtaining a baseline of biometric data of the user through the personal imaging system;

the computer selecting a biometric threshold level for the user based on the baseline of biometric data received; and the computer storing the baseline of the biometric data of the user and the selected biometric threshold level for the user with identification of the user and demographics of the user.

18. The method of claim 13, wherein the biometric levels of the user are captured through sensors in communication with the personal imaging system monitoring physiological characteristics of the user.

\* \* \* \* \*